Aug. 28, 1973   B. F. LATHAM, JR   3,755,543
AIR COOLED POROUS METAL PIPE FOR USE IN
FEEDSTOCK INJECTION ASSEMBLY
Filed Aug. 16, 1971
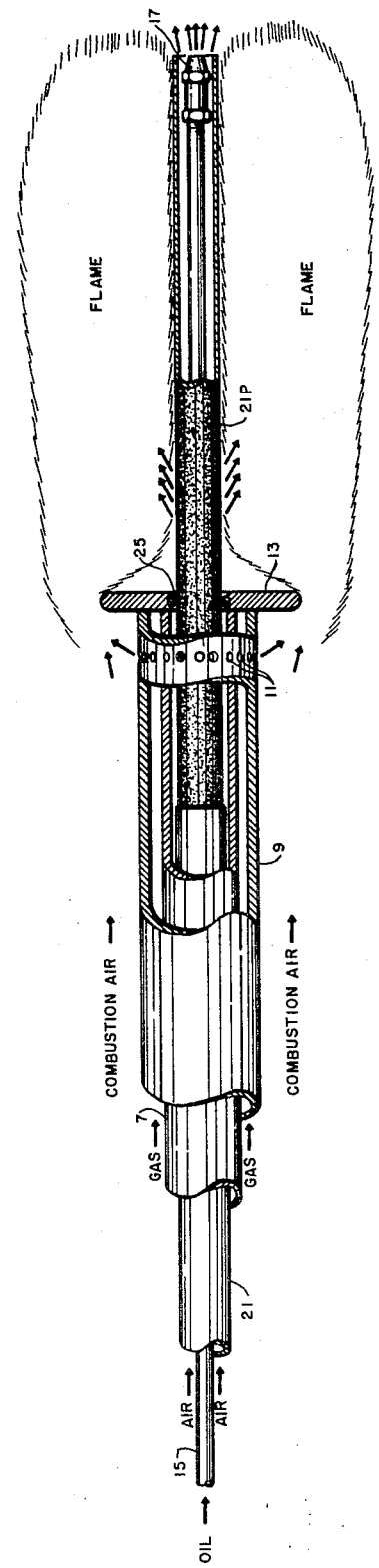
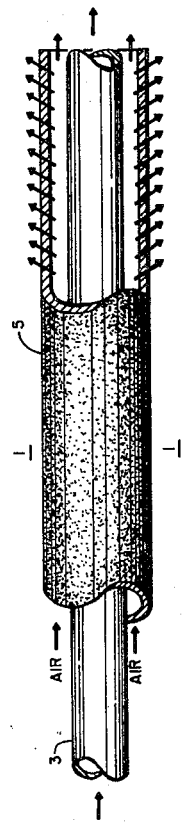
BURTON F. LATHAM, JR.
INVENTOR.
BY Jerry B. Peterson
ATTORNEY

United States Patent Office 3,755,543
Patented Aug. 28, 1973

3,755,543
AIR COOLED POROUS METAL PIPE FOR USE IN FEEDSTOCK INJECTION ASSEMBLY
Burton F. Latham, Jr., Houston, Tex., assignor to Continental Carbon Company, Houston, Tex.
Filed Aug. 16, 1971, Ser. No. 171,832
Int. Cl. C01b 31/02
U.S. Cl. 423—450                 5 Claims

ABSTRACT OF THE DISCLOSURE

A porous metal pipe surrounds a fluids conduit which is subjected to high temperatures, so that air can be passed into the annulus between the two pipes and through the porous pipe wall to assist in cooling the oil injection pipe. For example, the oil feedstock pipe in a carbon black reactor is surrounded by a porous metal pipe into which axial air is passed.

DISCLOSURE

Background of the invention

Field of the invention.—This invention relates to a device for cooling a pipe which is subjected to high temperatures. More specifically, the invention utilizes a porous metal pipe to surround another pipe which would otherwise be subjected to damaging high temperatures. Air or some other fluid cooling medium is passed through the annulus between the pipes and through the wall of the porous metal pipe to provide the cooling action.

The invention is particularly useful in the cooling of the oil feedstock pipe of a high-temperature carbon black furnace.

Description of the prior art.—Porous metals are known. See. U.S. Pat. 2,554,343. Porous metals have been used for a number of purposes, although applicant is not aware of any use of such metals for cooling purposes, let alone for cooling the feedstock pipe in a carbon black furnace.

Oil feedstock pipes in carbon black reactors have been cooled with air passing through the "axial air pipe" surrounding the feedstock pipe. For example, in U.S. Pat. 3,256,066, axial air enters the burner and feedstock injection assembly through a pipe 24, and then passes through the annulus between the feedstock pipe 20 and the axial air pipe 18. This flow of axial air not only serves the purposes mentioned in that patent but also cools the feedstock pipe, thus preventing damage by the high operating temperatures. A burner and feedstock assembly embodying these principles is shown in greater detail in U.S. Pat. 3,443,761 in which axial air passes through the annulus between tubes 5 and 7. One disadvantage of the air cooled axial pipe is that the outside of the pipe is exposed to the combustion flame. Also, the downstream end of the axial air pipe will sometimes melt when the pipe is extended far into the combustion zone.

Water has also been used to cool carbon black oil feedstock pipes. For example, see U.S. Pats. 2,895,804; 3,003,854; and 3,490,869. The use of water has certain disadvantages. For example, the water normally has to be recirculated through a heat exchanger to prevent the deposits on the pipes which would result if only fresh water were used. This recirculation requires additional equipment. Also, the outside of the axial water pipe is still exposed to the flame. Furthermore, the use of water cooling with recirculation results in conducting substantial amounts of heat away from the combustion zone just upstream of where the feedstock is introduced.

Objects of the invention

An object of this invention is to provide means for cooling a pipe which is subjected to high temperatures.

Another object of this invention is to utilize a porous metal pipe to surround another pipe which would otherwise be subjected to damaging high temperatures.

Another object of this invention is to utilize a porous metal pipe to surround the oil feedstock pipe high-temperature carbon black furnace.

Another object of this invention is to provide means for cooling a carbon black oil feedstock pipe in a manner such as to obviate the disadvantages inherent in the prior art methods.

Other objects will become apparent from the detailed description and drawings.

Summary of the invention

This invention comprises a porous metal pipe surrounding another concentric pipe which would otherwise be subjected to damaging high temperatures. Air or some other fluid cooling medium is passed through the annulus between the pipes and through the wall of the porous metal pipe to provide the cooling action.

A partciularly useful embodiment of the invention is in the cooling of the oil feedstock pipe of a carbon black furnace.

Brief description of the drawing

FIG. 1 is a side view, partly in section, illustrating an embodiment of the invention in its broadest form;

FIG. 2 is a side view, partly in section, illustrating the use of the invention in a carbon black burner and feedstock injection assembly.

Description of the preferred embodiments

Referring to FIG. 1, the material to be conveyed into or through the high-temperature environment 1 is passed into conduit or pipe 3 surrounded by concentric porous metal pipe 5. Air or some other cooling medium is passed through the annulus between pipes 3 and 5, and passes through the wall of porous pipe 5. The air not only cools pipes 3 and 5, but also covers the outside of the porous pipe 5 with a film of insulating air, thus protecting it from the high-temperature environment 1.

FIG. 2 illustrates an embodiment of the invention as used in a burner and feedstock injection assembly for a carbon black reactor or furnace. Combustion gas passes through the annulus between pipes 7 and 9 and discharges through holes 11 to mix with combustion air moving along the outside of pipe 9 as shown in the drawing. The combustion starts immediately downstream from flame-holder disc 13, the flame forming in approximtely the position shown in the drawing.

The feedstock oil (a conventional carbon black oil such as a highly-aromatic petroleum residuum) passes through feedstock conduit or pipe 15 and is sprayed into the reactor through nozzle 17 as a mist which is soon vaporized. This feedstock oil mixes with the hot combustion gases to initiate the carbon black forming reaction.

Axial air is passed through the annulus between feedstock oil pipe 15 and axial pipe 21. Most or all of the downstream portion 21P of axial air pipe 21 is made of porous metal so that air can pass through the wall of the axial pipe 21, as shown by the arrows in FIG. 2, to cool the nozzle 17 and the downstream end of the feedstock pipe, to cool the downstream end of axial air pipe 21, and to provide a protective film of insulating air around the outside of axial air pipe 21. Preferably, a space is left between the feedstock nozzle 17 and the inside wall of the downstream end of axial air pipe 21 in order that a stream of axial air passes out the end of pipe 21 to surround the feedstock spray in order to better atomize the oil, to prevent oil and coke deposits from building up on the feedstock nozzle 17, and to direct the oil spray down the center o fthe reactor so that it will not impinge on the walls. As shown in FIG. 2, the downstream ends of pipes 15 and 21 are flush or approximately flush.

Depending upon the particular grade of carbon black being manufactured, the downstream end of axial air pipe 21 and feedstock nozzle 17 will be extended at different distances downstream from flameholder disc 13. The subassembly comprising feedstock pipe 15 and axial air pipe 21 is therefore slideably mounted within the entire burner and feedstock injection assembly as, for example, such subassembly can be slideably mounted to flameholder disc 13 by means of a temperature resistant O-ring 25 such as a ring made of silicone rubber.

The design of the downstream end of the subassembly (pipes 15 and 21) can vary considerably. For example, the opening at the end can be narrowed to force more of the air through the porous wall 21P. As another example, the annulus between the downstream ends of pipes 15 and 21P can be equipped with means (not shown), such as a spiral spacer or other helical device for imparting a whirling motion to the axial air to provide better atomization of the feedstock oil.

The preparation of porous metals is described in U.S. Pat. 2,554,343. These porous metals can be fabricated into porous sheets which are then rolled and welded to form the desired porous metal pipe. A wide variety of pore sizes and metal thicknesses are available for fabrication into the porous metal pipe. The particular porosity and thickness selected will depend upon the air pressure used, the reaction temperatures, and the desired amount of axial air, if any, which is desired to be passed on through the end of the axial air pipe 21.

While we have thus described the preferred embodiments of the present invention, many variations will be suggested to those skilled in the art. The foregoing description and examples should therefore not be considered limitative; and all such variations and modifications as are in accord with the principles described are meant to fall within the scope of the appended claims.

Having thus described our invention, we claim:

1. In combination with a carbon black burner and feedstock injection assembly comprising means for generating hot combustion gases surrounding a conduit for feedstock oil, the improvement which comprises a porous metal pipe concentrically surrounding said conduit, thereby providing an annulus through which a gaseous cooling medium can be forced, whereby at least a portion of said cooling medium can pass through the walls of said porous metal pipe.

2. The combination of claim 1 in which the ends of said conduit and said porous metal pipe are approximately flush and are designed so as to provide an annular open space.

3. A method of cooling a carbon black feedstock oil conduit subjected to high temperatures in a carbon black reactor comprising the step of injecting a gaseous cooling medium into the annulus between said conduit and a porous metal pipe concentrically surrounding said conduit, whereby at least a portion of said cooling medium passes through the porous wall of said pipe.

4. The method of claim 3 in which the cooling medium is air.

5. The method of claim 4 in which the downstream ends of said conduit and said pipe are approximately flush and in which a portion of the air is passed through an annular space at said ends.

References Cited
UNITED STATES PATENTS

| | | | |
|---|---|---|---|
| 3,175,888 | 3/1965 | Krejci | 23—259.5 |
| 3,497,324 | 2/1970 | Loewen | 23—259.5 |

EDWARD J. MEROS, Primary Examiner

S. B. SHEAR, Assistant Examiner

U.S. Cl. X.R.

423—456; 23—259.5